US009836434B2

(12) United States Patent
Lvov et al.

(10) Patent No.: US 9,836,434 B2
(45) Date of Patent: Dec. 5, 2017

(54) RUNTIME OF CUBLAS MATRIX MULTIPLICATION ON GPU

(71) Applicant: INTERNATIONAL BUSINESS MACHINES CORPORATION, Armonk, NY (US)

(72) Inventors: Alexey Y. Lvov, Congers, NY (US); Jinjun Xiong, White Plains, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 14/823,889

(22) Filed: Aug. 11, 2015

(65) Prior Publication Data

US 2017/0046307 A1  Feb. 16, 2017

(51) Int. Cl.
*G06F 17/16* (2006.01)
*G06T 1/20* (2006.01)

(52) U.S. Cl.
CPC ............... *G06F 17/16* (2013.01); *G06T 1/20* (2013.01); *G06T 2200/28* (2013.01)

(58) Field of Classification Search
None
See application file for complete search history.

(56) References Cited

U.S. PATENT DOCUMENTS 8,924,455 B1 * 12/2014 Barman ................ G06F 7/5443
  708/607
2010/0156888 A1   6/2010 Luk et al.
2012/0233486 A1   9/2012 Phull et al.
2013/0002659 A1   1/2013 Jiang et al.
2014/0063027 A1   3/2014 Becker
2015/0120261 A1   4/2015 Giannacopoulos et al.
2015/0134714 A1 * 5/2015 Liao ........................ G06T 1/60
  708/250

(Continued)

FOREIGN PATENT DOCUMENTS

WO   WO2012076377   6/2012
WO   WO2014201855  12/2014

*Primary Examiner* — David H Malzahn

(74) *Attorney, Agent, or Firm* — Tutunjian & Bitetto, P.C.; Rabin Bhattacharya

(57) ABSTRACT

Methods for improving matrix multiplication runtimes are provided. A method includes determining, by a GPU, optimal partitions for matrix-by-matrix multiplication of two factor matrices having sizes known a priori. The determining step includes performing offline a plurality of matrix-by-matrix multiplication executions, each for a respective different combination of two-way partitions across a plurality of partition sizes. The determining step further includes determining offline a respective performance number for each of the executions based on runtime. The determining step also includes recursively repeating offline said performing and determining steps until the respective performance number ceases to improve for best-performing combinations of the two-way partitions and saving the best performing combinations of the two-way partitions as the optimal partitions. The method further includes performing online, by the GPU, the matrix-by-matrix multiplication of the two factor matrices using calls for a given one of the best performing combinations of the two-way partitions.

20 Claims, 6 Drawing Sheets

(56) References Cited

U.S. PATENT DOCUMENTS

2016/0210723 A1* 7/2016 Yang .................... G06T 1/20
2017/0046307 A1* 2/2017 Lvov .................. G06F 17/16
2017/0060811 A1* 3/2017 Yang .................. G06F 17/16

* cited by examiner

RUNTIME OF CUBLAS MATRIX MULTIPLICATION ON GPU

BACKGROUND

Technical Field

The present invention relates generally to information processing and, in particular, to improving the runtime of CUda Basic Linear Algebras Subroutines (CUBLAS) matrix multiplication on a Graphics Processing Unit (GPU).

Description of the Related Art

Matrix multiplication is a generic operation in many computationally intensive applications. Deep neuron network training is one of the most prominent such applications. Other such applications include, but are not limited to, molecular mechanics simulation, gas and fluid dynamics, weather forecast, quantum chemistry, linear optimization, and so forth.

A Graphics Processing Unit (GPU) is a widely used platform for accelerating matrix multiplication by ten or more times compared to a Central Processing Unit (CPU). For example, NVIDIA® ships a library of CUda Basic Linear Algebras Subroutines (CUBLAS) created specifically for NVIDIA® GPUs.

The efficiency of matrix multiplication on a GPU by CUBLAS library functions greatly varies with matrix sizes. Hence, there is a need for improving runtime of CUBLAS matrix multiplication on a Graphics Processing Unit (GPU).

SUMMARY

According to an aspect of the present principles, a method is provided. The method includes determining, by a graphics processing unit, optimal partitions for matrix-by-matrix multiplication of two factor matrices having sizes known a priori. The determining step includes performing offline a plurality of matrix-by-matrix multiplication executions, each for a respective different combination of two-way partitions across a plurality of partition sizes. The determining step further includes determining offline a respective performance number for each of the plurality of matrix-by-matrix multiplication executions based on runtime. The determining step also includes recursively repeating offline said performing and determining steps until the respective performance number ceases to improve for best-performing combinations of the two-way partitions and saving the best performing combinations of the two-way partitions as the optimal partitions. The method further includes performing online, by the graphics processing unit, the matrix-by-matrix multiplication of the two factor matrices using calls for a given one of the best performing combinations of the two-way partitions.

According to another aspect of the present principles, a method is provided. The method includes determining, by a graphics processing unit, optimal partitions for matrix-by-matrix multiplication of factor matrices having respective sizes that fall within a plurality of different sizes of factor matrices included in a set S. The determining step includes performing offline a plurality of matrix-by-matrix multiplication executions for each of the plurality of different sizes of the factor matrices in the set S, each for a respective one of a plurality of different partition combinations of the factor matrices in the set S. The determining step further includes determining offline as the optimal partitions, for each of the plurality of different partition combinations of the factor matrices in the set S, a given partition having a shortest runtime and storing information therefor. The determining step also includes storing offline in a data structure, information about the given partition having the shortest runtime for each of the plurality of different partition combinations of the factor matrices in the set S. The determining step additionally includes selecting on-line using the data structure, one or more best partitions of given sizes for use in multiplying the factor matrices in the matrix-by-matrix multiplication. The method further includes performing online, by the graphics processing unit, the matrix-by-matrix multiplication of the factor matrices using the selected one or more best partitions.

According to yet another aspect of the present principles, a method is provided. The method includes determining, by a graphics processing unit, near optimal partitions for matrix-by-matrix multiplication of a factor matrix A and a factor matrix B having respective sizes bounded by an integer number and being arbitrarily variable from call to call. The determining step includes performing offline a plurality of matrix-by-matrix multiplication executions for values of variables m, n, and k varying in a range [0, MaxSize] with steps M, N, and K, respectively, to build and store an efficiency matrix E(m, n, k). The determining step further includes searching the efficiency matrix online given the values of the variables m, n, and k, and using search construct E(*1, *2, *3) having the second argument *2, and the third argument *3 fixed to the values of variables n and k, respectively, and the first argument *1 varying in a range [1, m] to determine a near optimal horizontal two-way partition of matrix A based on shortest runtime. The method also includes searching the efficiency matrix online given the values of the variables m, n, and k, and using the search construct E(*1, *2, *3) having the first argument *1, and the third argument *3 fixed to the values of variables m and k, respectively, and the second argument *2 varying in a range [1, n] to determine a near optimal vertical two-way partition of matrix B based on the shortest runtime. The method further includes performing online, by the graphics processing unit, the matrix-by-matrix multiplication of the factor matrix A and the factor matrix B using the determined near optimal horizontal two-way partition of matrix A and the determined near optimal vertical two-way partition of matrix.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to improving the runtime of CUda Basic Linear Algebras Subroutines (CUBLAS) matrix multiplication on a Graphics Processing Unit (GPU).

In an embodiment, the present principles involve splitting one or both factor matrices into pieces; multiplying the pieces pairwise; concatenating the results; and using pointer arithmetic to write the partial products directly into their correct positions in memory. In this way, concatenation advantageously does not require any additional operations, as readily appreciated by one of ordinary skill in the art given the teachings of the present principles provided herein.

Figure 1:
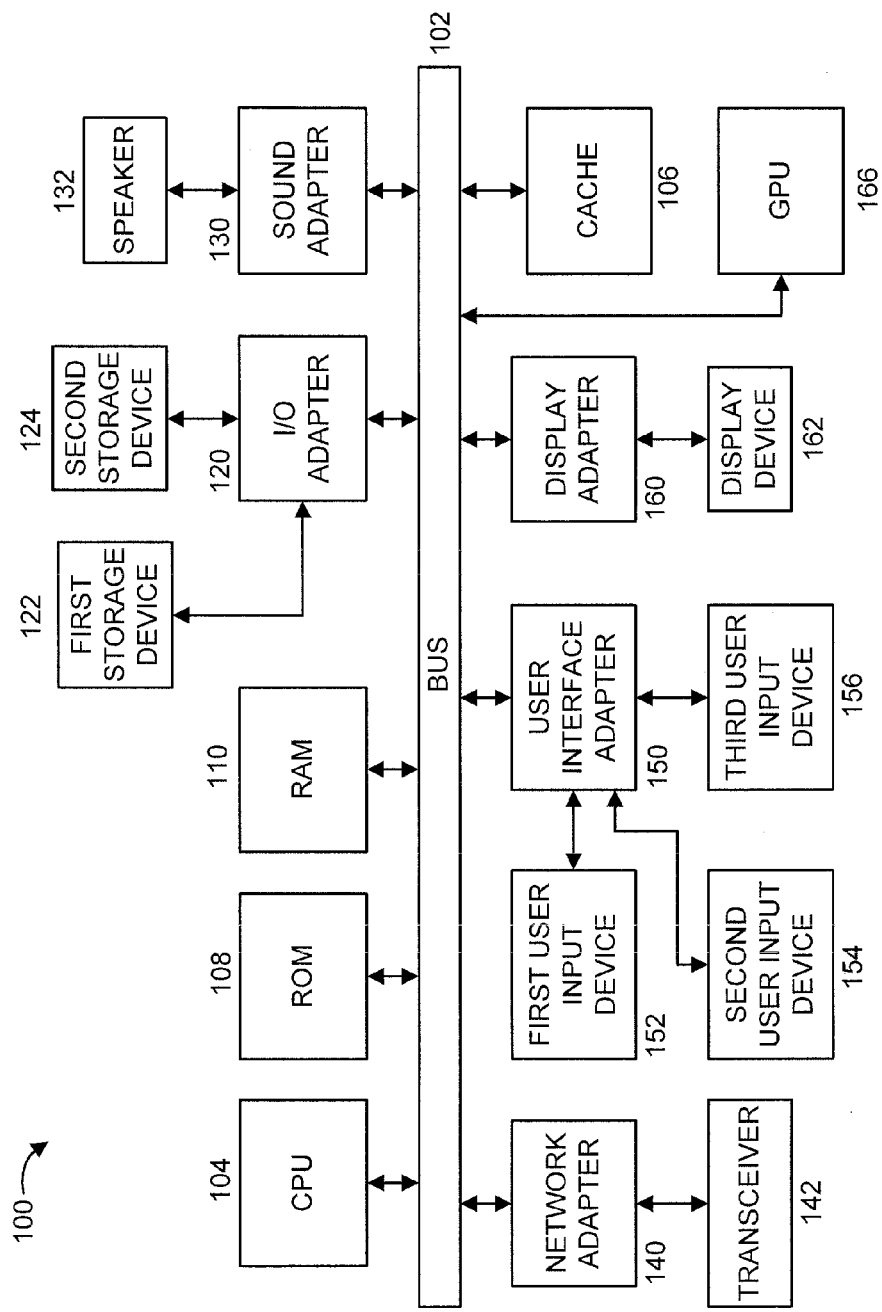
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one Central Processing Unit (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. A Graphics Processing Unit (GPU) 166 is also operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
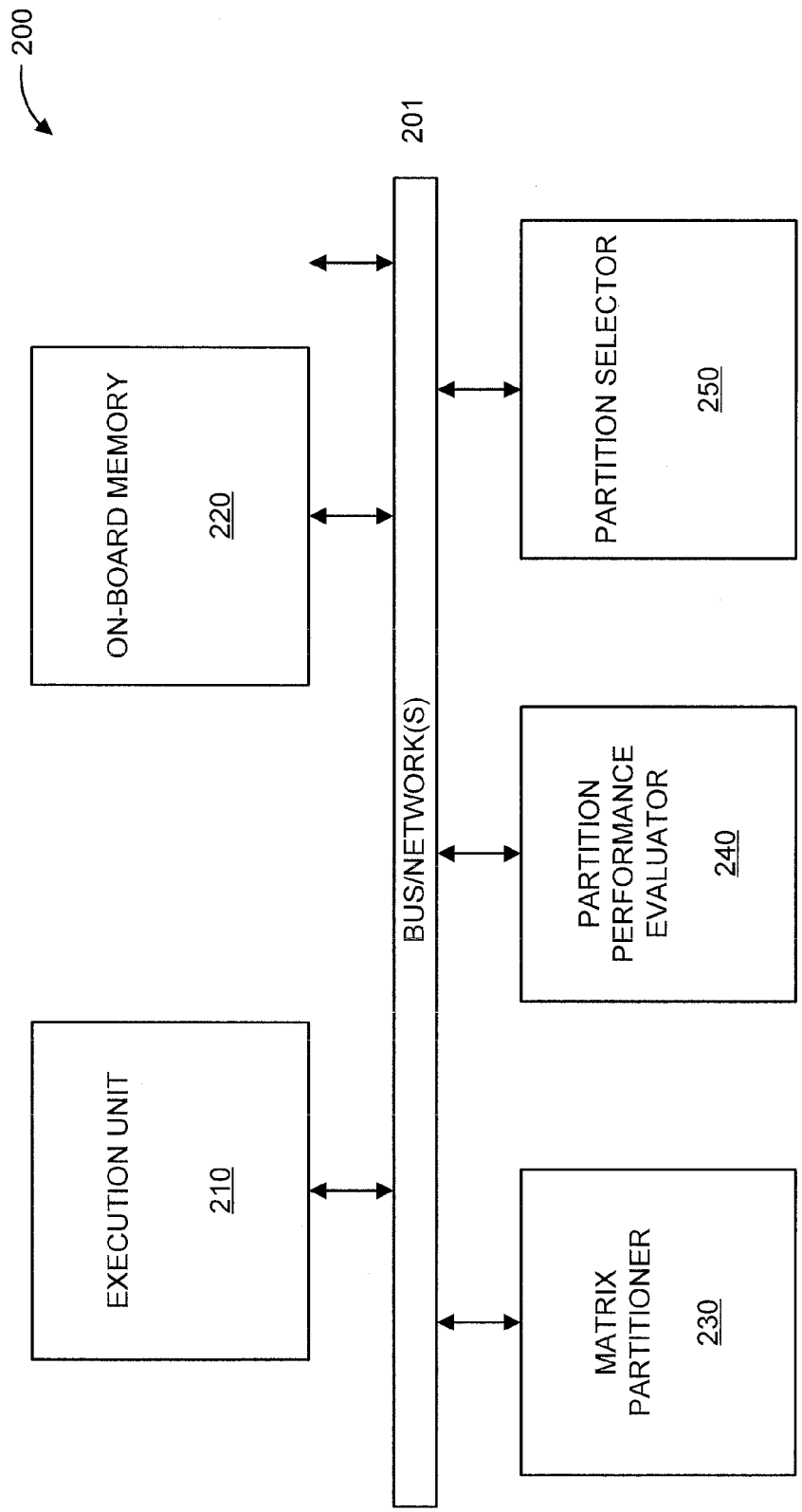
FIG. 2 shows an exemplary Graphics Processing Unit (GPU) 200 for improving the runtime of CUBLAS matrix multiplication, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
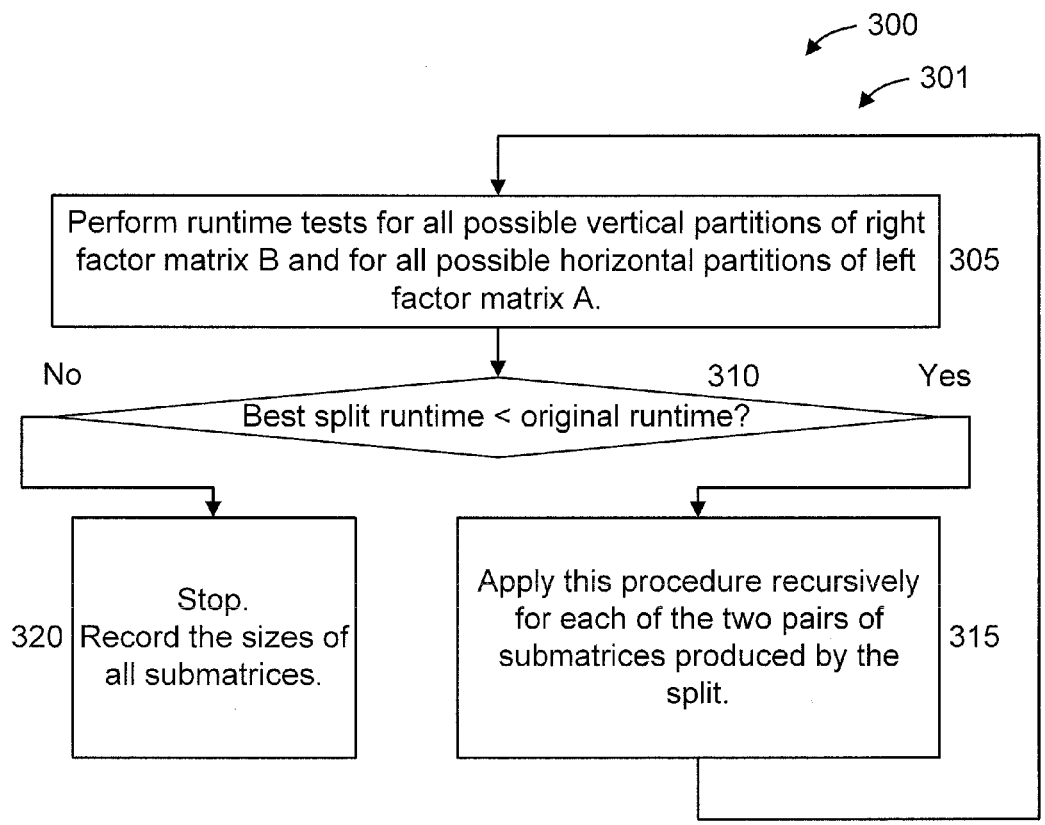
FIG. 3 shows an exemplary method 300 for improving the runtime of CUBLAS matrix multiplication on a Graphics Processing Unit (GPU), in accordance with an embodiment of the present principles.
Figure 4:
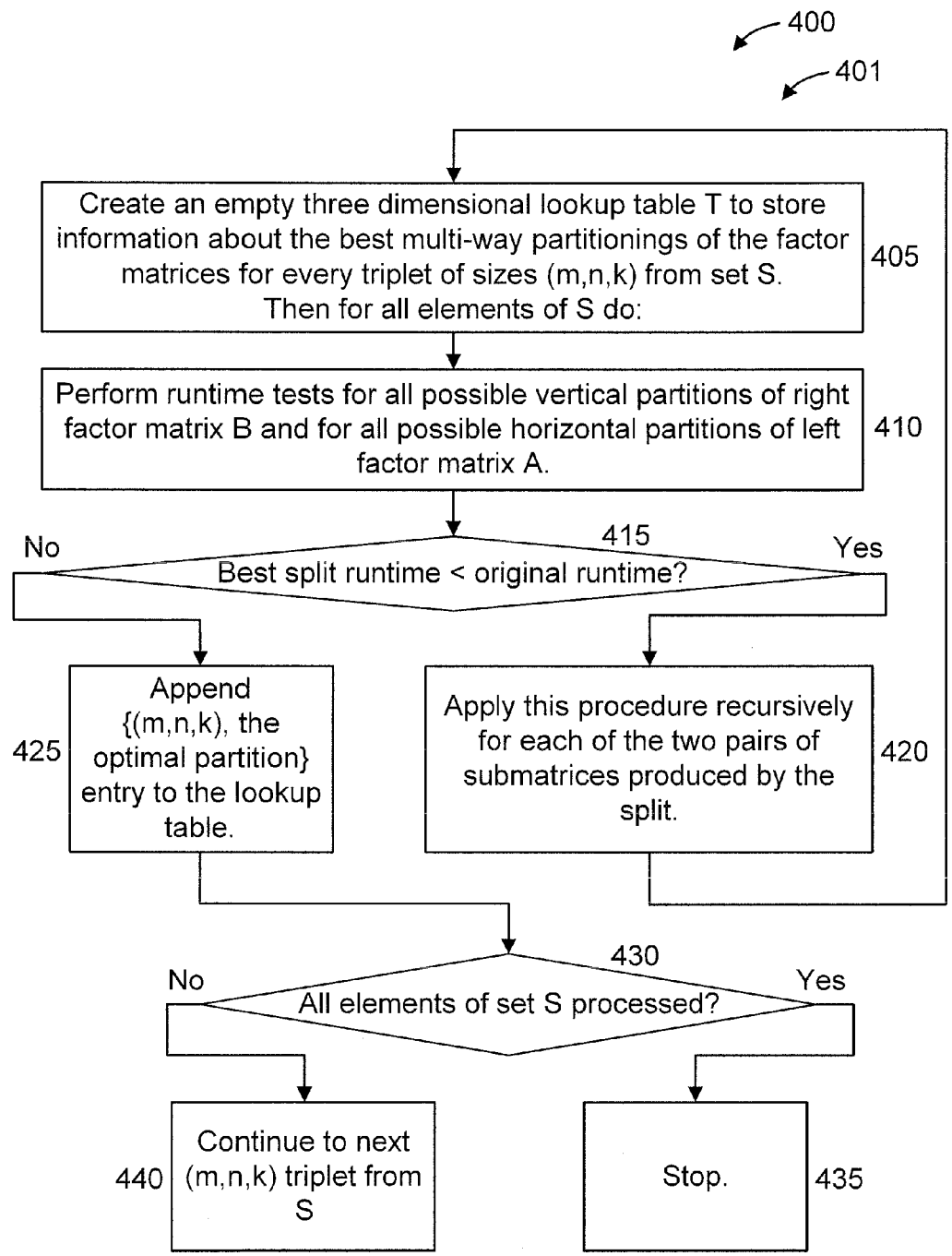
FIGS. 4-5 show another exemplary method 400 for improving the runtime of CUBLAS matrix multiplication on a Graphics Processing Unit (GPU), in accordance with an embodiment of the present principles.
Figure 5:
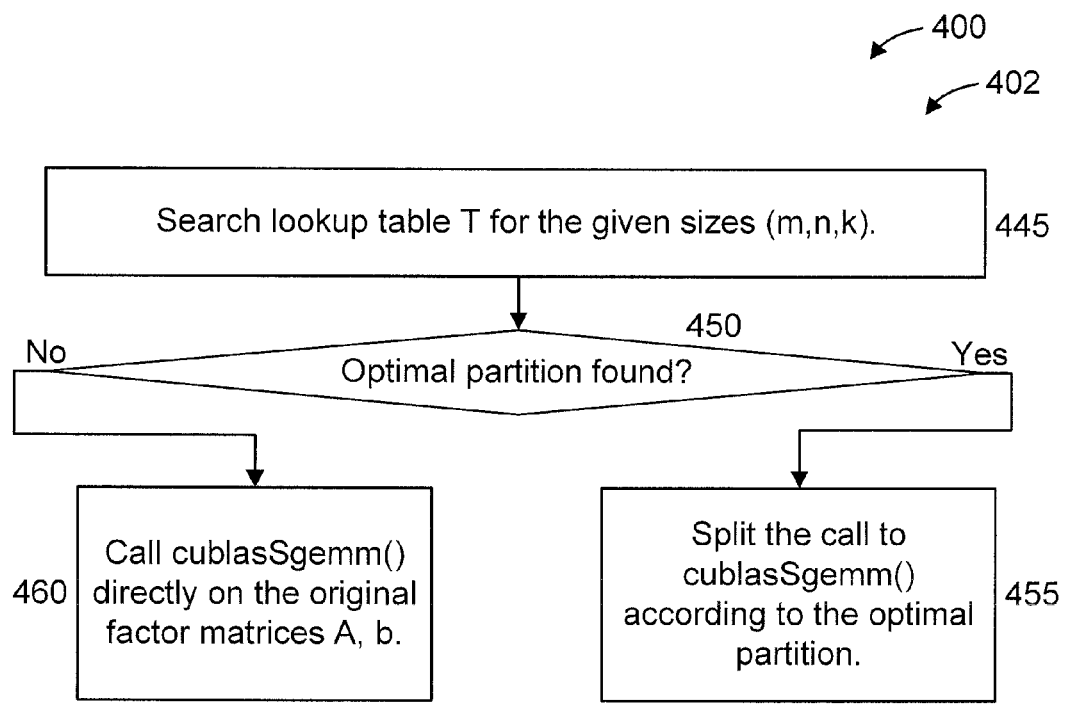
Figure 6:
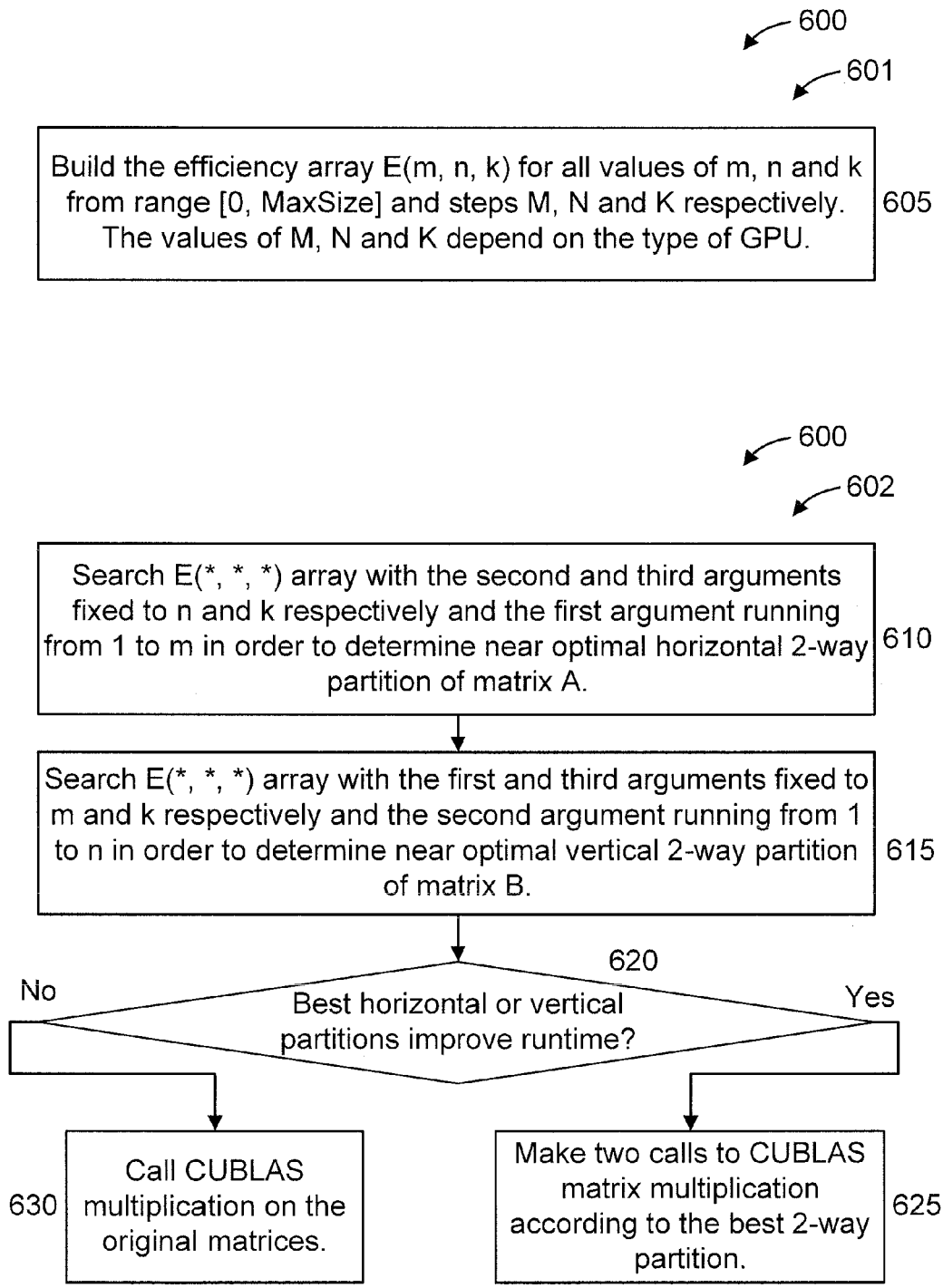
FIG. 6 shows yet another exemplary method 600 for improving the runtime of CUBLAS matrix multiplication on a Graphics Processing Unit (GPU), in accordance with an embodiment of the present principles.

Further, it is to be appreciated that processing system 100 may perform at least part of the method described herein including, for example, at least part of method 300 of FIG. 3 and/or at least part of method 400 of FIGS. 4-5 and/or at least part of method 600 of FIG. 6. Similarly, part or all of system 200 may be used to perform at least part of method 300 of FIG. 3 and/or at least part of method 400 of FIGS. 4-5 and/or at least part of method 600 of FIG. 6.

FIG. 2 shows an exemplary Graphics Processing Unit (GPU) 200 for improving the runtime of CUBLAS matrix multiplication, in accordance with an embodiment of the present principles. It is to be appreciated that for the sake of brevity, only elements relating to the present principles are described with respect to GPU 200. Thus, while the GPU 200 will include other elements, as readily appreciated by one of ordinary skill in the art, the description of GPU 200 is directed to the present principles and elements relating thereto.

The GPU 200 includes a set of execution units (hereinafter "execution unit" in short) 210, on-board memory 220, a matrix partitioner 230, a partition performance evaluator 240, a partition selector 250.

The execution unit 210 performs executions relating to at least graphics processing. Such graphics processing includes matrix-by-matrix multiplication which, in turn, includes submatrix-by-submatrix multiplication involving partitions determined in accordance with the present principles.

The on-board memory 220 stores data for the graphics processing. In an embodiment, the on-board memory stores lookup tables, arrays, and other data structures relating to graphics processing.

The matrix partitioner 230 partitions matrices partitions for use in matrix-by-matrix multiplication in accordance with the present principles. For example, matrix partitioner 230 partitions matrix partitions in accordance with any of methods 300, 400, and 500 shown in FIGS. 3, 4-5, and 6, respectively.

The partition performance evaluator 240 works in conjunction with the matrix partitioner 230 to evaluate partitions based on runtime. For example, optimal and/or near optimal partitions are determined based on shortest runtimes, as compared to other partitions having longer runtimes and thus, being not optimal or near optimal.

The partition selector 250 selects partitions based on the results of the performance evaluator 240. In an embodiment, the selected partitions are stored in on-board memory 220 for future use. For example, in an embodiment, selected partitions are stored offline for future use in online operations.

It is to be appreciated that different embodiments of the present principles will implicate different ones of the preceding elements of the GPU 200.

In the embodiment shown in FIG. 2, the elements thereof are interconnected by a bus 201. However, in other embodiments, other types of connections can also be used. Moreover, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of GPU 200 are readily determined by one of ordinary skill in the art, given the teachings of the present principles provided herein, while maintaining the spirit of the present principles.

FIG. 3 shows an exemplary method 300 for improving the runtime of CUBLAS matrix multiplication on a Graphics Processing Unit (GPU), in accordance with an embodiment of the present principles. The method 300 is applied to two factor matrices, namely factor matrix A and factor matrix B. The method 300 corresponds to the case where the respective sizes of factor matrix A and factor matrix B are known a priori. The method 300 includes an offline portion 301 and an online portion 302. Steps 305, 310, 315, and 320 are performed offline in the offline portion 301, and step 325 is performed online in the online portion 302.

At step 305, perform runtime test for all possible vertical partitions of factor matrix B for all possible horizontal partitions of factor matrix A.

At step 310, determine if the best split runtime is smaller than the original (non-partitioned) runtime. If so, then the method proceeds to step 315. Otherwise, the method proceeds to step 320.

At step 315, apply method 300 recursively for each of the two pairs of submatrices produced by the split.

At step 320, record the sizes of all submatrices.

At step 325, split each call to cublasSgemm( ) according to the best partition found. CublasSgemm is a CUBLAS function as follows:
S=single precision (float)
ge=general
m=multiplication
m=matrix.

We now provide exemplary code showing conventional CUDA code for matrix multiplication and CUDA code for matrix multiplication in accordance with an embodiment of the present principles. The CUDA code relates to the Attila Speech Recognition Project, where the forward convolution function reduces to multiplication of 256×3072 and 3072× 2048 matrices. The runtime of the conventional CUDA code has a runtime of 215 ms. The runtime of the CUDA code in accordance with the present principles has a runtime of 185 ms. Hence, the CUDA code in accordance with the present principles advantageously provides a sixteen percent runtime speedup over the conventional CUDA code.

The exemplary conventional CUDA code for matrix multiplication can be as follows:

```
cublasSgemm(
    cublasHandle,
    CUBLAS_OP_N,
    CUBLAS_OP_N,
    m, 2048, k,
    &h1, dW, m, dCX, k,
    &h0, dY, m
);
```

The exemplary CUDA code for matrix multiplication in accordance with the present principles is as follows:

```
cublasSgemm(
    cublasHandle,
    CUBLAS_OP_N,
    CUBLAS_OP_N,
    m, 1920, k,
    &h1, dW, m, dCX, k,
    &h0, dY, m
);
cublasSgemm(
    cublasHandle,
    CUBLAS_OP_N,
    CUBLAS_OP_N,
    m, 128, k,
    &h1, dW, m,
```

-continued

```
    dCX + k * sizeof(float) * 480, k,
    &h0,
    dY + m * sizeof(float) * 480, m
);
```

FIGS. 4-5 show another exemplary method 400 for improving the runtime of CUBLAS matrix multiplication on a Graphics Processing Unit (GPU), in accordance with an embodiment of the present principles. The method 400 involves a set S of factor matrices. Preferably, the number of factor matrices in set S is large. The factor matrices in set S have different sizes. The method 400 is applied to matrices whose size is variable, but fall within the sizes of the factor matrices in set S. Offline processing of the factor matrices in set S yields a runtime savings when applied at runtime to factor matrices to be multiplied in a matrix-by-matrix operation. The method 400 includes an offline portion 401 and an online portion 402. Steps 405, 410, 415, 420, 425, 430, 435, and 440 are performed offline in the offline portion 401, and steps 445, 450, 455, and 460 are performed online in the online portion 402.

At step 405, create an empty three-dimensional lookup table T to store information about the best multi-way partitionings of the factor matrices for every triplet of sizes (m, n, k) from the set S of factor matrices.

At step 410, perform runtime tests for all possible vertical partitions of right factor matrix B and for all possible horizontal partitions of left factor matrix A.

At step 415, determine whether the best split runtime is smaller than the original runtime. If so, then the method proceeds to step 420. Otherwise, the method proceeds to step 425.

At step 420, apply this procedure recursively for each of the two pairs of submatrices produced by the split.

At step 425, append {(m, n, k), the optimal partition} entry to the lookup table.

At step 430, determine whether all elements of set S have been processed. If so, then the method proceeds to step 435. Otherwise, the method proceeds to step 440.

At step 435, the offline portion of the method is terminated.

At step 440, continue to the next (m, n, k) triplet from S.

At step 445, search lookup table T for the given sizes (m, n, k). Typically, matrix sizes in a neural network and other important applications require several milliseconds for a single multiplication operation, so the table lookup time (less than a microsecond of CPU time) is negligible.

At step 450, determine whether the optimal partition has been found. If so, then the method proceeds to step 455. Otherwise, the method proceeds to step 460.

At step 455, split the call to cublasSgemm( ) according to the optimal partition.

At step 460, call cublasSgemm( ) directly on the original factor matrices A and B.

FIG. 6 shows yet another exemplary method 600 for improving the runtime of CUBLAS matrix multiplication on a Graphics Processing Unit (GPU), in accordance with an embodiment of the present principles. The method 600 is applied to two factor matrices, namely factor matrix A and factor matrix B. The method 600 involves constructing a three-dimensional efficiency array offline, which is then searched online to determine near optimal partitions of factor matrix A and factor matrix B. The method 600 includes an offline portion 601 and an online portion 602. Step 605 is performed offline in the offline portion 601, and steps 610, 615, 620, 625, and 630 are performed online in the online portion 602.

At step 605, build an efficiency array E(m, n, k) for all values of m, n, and k from range [0, MaxSize] and steps M, N, and K, respectively. In an embodiment, the values of M, N, and K depend on the type of GPU. For example, in an embodiment, they only have to be computed once per a given GPU type by computing E(m, n, k) at every point of a sufficiently large cube and observing the piecewise constant (ladder-like) structure of the function along each of the three directions m, n and k. M, N and K are the lengths of steps in these directions.

At step 610, search E(*, *, *) array with the second and third arguments fixed to n and k, respectively, and the first argument running from 1 to m in order to determine the near optimal horizontal 2-way partition of matrix A.

At step 615, search E(*, *, *) array with the first and third arguments fixed to m and k, respectively, and the second argument running from 1 to n in order to determine a near optimal vertical 2-way partition of matrix B.

At step 620, determine whether the best horizontal and vertical partitions improve runtime. If so, then the method proceeds to step 525. Otherwise, the method proceeds to step 630.

At step 625, make two calls to CUBLAS matrix multiplication according to the best 2-way partition.

At step 630, call CUBLAS multiplication on the original matrices.

A description will now be given regarding the basis of the present principles and the advantages relating thereto.

Let $$E(m, n, k) \stackrel{def}{=} \frac{2mnk}{\text{Runtime}(m, n, k)}$$

be the efficiency of matrix multiplication of matrix A of size m-by-k and matrix B of size k-by-n, and let E(m, n, k) be not monotonically increasing with n. Then

[A] × [B1] concatenate [A] × [B2]

may run faster than

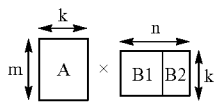

for some vertical partition of B.

Analogously, if E(m, n, k) is not monotonically increasing with m,

[A1] × [B] concatenate [A2] × [B]

may run faster than

[A1 / A2] × [B]

for some horizontal partition of A.

It is to be appreciated that a reason that enables the present principles to provide a significant runtime improvement for certain sizes of factor matrices is that the efficiency E(m, n, k) of CUBLAS matrix multiplication is not monotonically increasing with m and n.

In fact, if E(m, n, k) would be monotonically increasing with m, then for any horizontal split of the left factor matrix A into submatrices of heights m1 and m2 we would have the following:

Runtime$(m_1, n, k)$ + Runtime$(m_2, n, k)$ =

$$\frac{2m_1nk}{E(m_1nk)} + \frac{2m_2nk}{E(m_2nk)} \geq \frac{2m_1nk}{E(mnk)} + \frac{2m_2nk}{E(mnk)} =$$

$$\frac{2m_1nk + 2m_2nk}{E(mnk)} = \frac{2mnk}{E(mnk)} = \text{Runtime}(m, n, k).$$

Analogously, if E(m, n, k) would be monotonically increasing with n, then for any vertical split of the right factor matrix B the total runtime for multiplication of the submatrices would be greater than the runtime of the direct multiplication.

A description will now be given regarding several generalizations exploited by the present principles, in accordance with an embodiment of the present principles.

If one of the matrices can be split in a way that reduces the total runtime of the multiplication, the present principles can be applied recursively to each new pair of submatrices producing further splits until none of the multiplication runtimes for pairs of submatrices can be reduced by a split. For example:

[A1 / A2] × [B]

Reduces to

[A1] × [B] concatenate [A2] × [B]

Reduces to

[A1] × [B1] con. [A1] × [B2] con. [A2] × [B3] con. [A2] × [B4]

The multiplication runtime depends only on the sizes of the factor matrices, and not on the values of matrix elements. Given (m, n, k), the optimal sizes of submatrices have to be found experimentally by measuring runtimes for all possible splits once only, and then they can be reused.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
   determining, by a graphics processing unit, optimal partitions for matrix-by-matrix multiplication of two factor matrices having sizes known a priori, wherein said determining step includes:
   performing offline a plurality of matrix-by-matrix multiplication executions, each for a respective different combination of two-way partitions across a plurality of partition sizes;
   determining offline a respective performance number for each of the plurality of matrix-by-matrix multiplication executions based on runtime;
   recursively repeating offline said performing and determining steps until the respective performance number ceases to improve for best-performing combinations of the two-way partitions and saving the best performing combinations of the two-way partitions as the optimal partitions; and
   performing online, by the graphics processing unit, the matrix-by-matrix multiplication of the two factor matrices using calls for a given one of the best performing combinations of the two-way partitions.

2. The method of claim 1, wherein the two-way partitions comprise combinations of horizontal and vertical partitions.

3. The method of claim 1, wherein performing offline the plurality of matrix-by-matrix multiplication executions comprises performing runtime tests for all possible vertical partitions of one of the two matrices and for all possible horizontal partitions of another one of the two matrices.

4. The method of claim 1, wherein said recursively repeating step comprises recursively repeating said offline performing and determining steps for each of two pairs of submatrices produced by a split.

5. The method of claim 1, wherein the best-performing combinations of the two-way partitions are determined responsive to respective performance numbers corresponding thereto.

6. The method of claim 1, wherein the respective performance number is an actual respective runtime for a respective one of the plurality of matrix-by-matrix multiplication executions.

7. A non-transitory article of manufacture tangibly embodying a computer readable program which when executed causes a computer to perform the steps of claim 1.

8. A method, comprising:
   determining, by a graphics processing unit, optimal partitions for matrix-by-matrix multiplication of factor matrices having respective sizes that fall within a plurality of different sizes of factor matrices included in a set S, wherein said determining step includes:
   performing offline a plurality of matrix-by-matrix multiplication executions for each of the plurality of different sizes of the factor matrices in the set S, each for a respective one of a plurality of different partition combinations of the factor matrices in the set S;
   determining offline as the optimal partitions, for each of the plurality of different partition combinations of the factor matrices in the set S, a given partition having a shortest runtime and storing information therefor;
   storing offline in a data structure, information about the given partition having the shortest runtime for each of the plurality of different partition combinations of the factor matrices in the set S;
   selecting on-line using the data structure, one or more best partitions of given sizes for use in multiplying the factor matrices in the matrix-by-matrix multiplication; and
   performing online, by the graphics processing unit, the matrix-by-matrix multiplication of the factor matrices using the selected one or more best partitions.

9. The method of claim 8, wherein the data structure is a lookup table.

10. The method of claim 9, wherein said storing step stores information about a plurality of best multi-way partitionings of the factor matrices included in the set S based on the shortest runtime for every triplet of sizes from the set S.

11. The method of claim 8, wherein performing online, by the graphics processing unit, the matrix-by-matrix multiplication of the factor matrices comprises directly calling, online, a CUda Basic Linear Algebras Subroutines matrix multiplication operation for matrices having particular sizes different from the plurality of different sizes of the factor matrices included in the set S.

12. The method of claim 8, wherein performing offline the plurality of matrix-by-matrix multiplication executions comprises performing runtime tests for all possible vertical partitions of one of the two matrices and for all possible horizontal partitions of another one of the two matrices.

13. The method of claim 8, further comprising recursively repeating said offline performing and determining steps for each of two pairs of submatrices produced by a split.

14. The method of claim 8, wherein said selecting step comprises searching the data structure for a triplet of matrix sizes.

15. The method of claim 8, wherein the method extends an existing library of matrix multiplication subroutines with a wrapping code layer.

16. A non-transitory article of manufacture tangibly embodying a computer readable program which when executed causes a computer to perform the steps of claim 8.

17. A method, comprising:
  determining, by a graphics processing unit, near optimal partitions for matrix-by-matrix multiplication of a factor matrix A and a factor matrix B having respective sizes bounded by an integer number and being arbitrarily variable from call to call, wherein said determining step includes:
    performing offline a plurality of matrix-by-matrix multiplication executions for values of variables m, n, and k bounded by the integer number and varying in a range [0, MaxSize] with steps M, N, and K, respectively, to build and store an efficiency matrix E(m, n, k);
    searching the efficiency matrix online given the values of the variables m, n, and k, and using search construct E(*1, *2, *3) having the second argument *2, and the third argument *3 fixed to the values of variables n and k, respectively, and the first argument *1 varying in a range [1, m] to determine a near optimal horizontal two-way partition of matrix A based on shortest runtime;
    searching the efficiency matrix online given the values of the variables m, n, and k, and using the search construct E(*1, *2, *3) having the first argument *1, and the third argument *3 fixed to the values of variables m and k, respectively, and the second argument *2 varying in a range [1, n] to determine a near optimal vertical two-way partition of matrix B based on the shortest runtime; and
  performing online, by the graphics processing unit, the matrix-by-matrix multiplication of the factor matrix A and the factor matrix B using the determined near optimal horizontal two-way partition of matrix A and the determined near optimal vertical two-way partition of matrix.

18. The method of claim 17, wherein the values of steps M, N, and K are determined responsive to a type of the graphics processing unit.

19. The method of claim 17, wherein the method extends an existing library of matrix multiplication subroutines with a wrapping code layer.

20. A non-transitory article of manufacture tangibly embodying a computer readable program which when executed causes a computer to perform the steps of claim 17.

* * * * *